July 23, 1935.  N. J. OAK  2,008,992
VARIABLE SPEED TRANSMISSION DEVICE
Filed Dec. 23, 1932  2 Sheets-Sheet 1
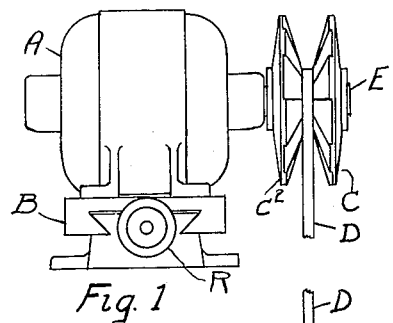
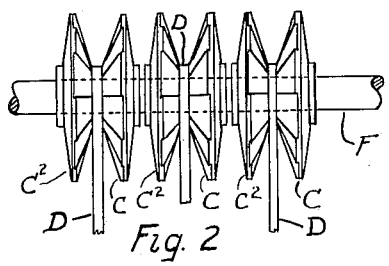
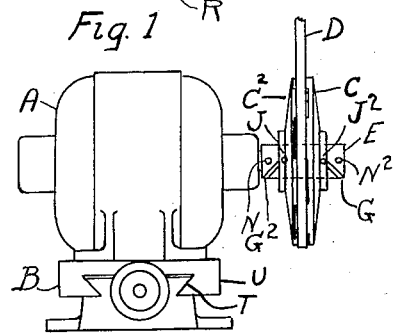
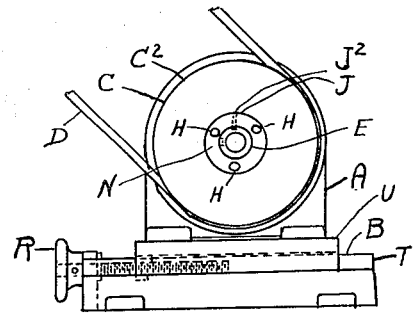
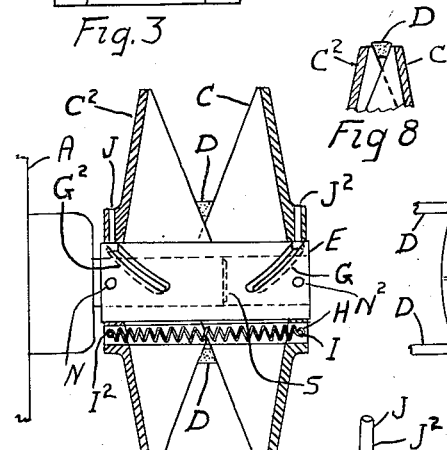
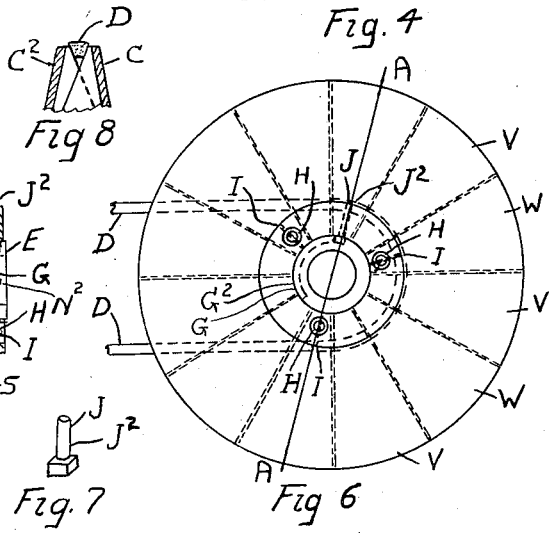
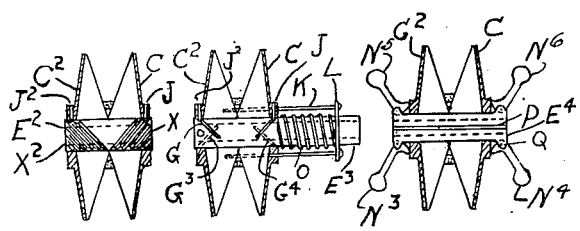
*Noah J. Oak,*
INVENTOR.

Patented July 23, 1935

2,008,992

UNITED STATES PATENT OFFICE 2,008,992

VARIABLE SPEED TRANSMISSION DEVICE

Noah Johnson Oak, Lynn, Mass.

Application December 23, 1932, Serial No. 648,715

4 Claims. (Cl. 74—230.17)

This invention relates to power transmission of the variable speed type, it has for its purpose to provide a new and efficient means for varying the speed of a driving and a driven unit; to provide a new and novel combination of an expanding sheave and V-belt transmission; to provide new and novel variable speed transmission means in combination with a belt, all adaptable to vary the revolutions per minute of the driven unit; to provide a variable transmission means capable of greater speed than has heretofore been possible on variable transmission types; to provide a variable transmission means of lighter construction than has heretofore been deemed feasible; to provide a variable transmission adaptable to mechanism of smaller horsepower and to larger horsepower than has heretofore been possible; to render feasible the use of multiple driving belts of small size for transmitting large horsepower; to thereby reduce installation and operating costs; to afford a greater efficiency of variable transmission means; to provide a constant driving force efficiently developed from a variable transmission; to provide an improved construction providing for the changing of the sheave unit end for end on the shaft so as to insure the pull of the belt in the right direction; to provide two intermeshing sections conically shaped on one side, designed to interlock at their contacting sides so as to function as a sheave, said intermeshing conical sections adaptable for adjustment closely together or distanced so as to vary the external circumference at their contacting points, and to function with a connecting V belt that will lay in or fit onto the sides of the V formed by the two intermeshing conical sections at their intermeshing point, so as to form a driving or a driven unit; to provide a means of moving the two intermeshing conical faced sections inwardly or outwardly uniformly in order to hold the alignment of the belt; to provide an automatic means of maintaining the proper tension on the belt in relation to the load pulled; to provide a means for adjusting the relative position of the sheave parts as required for varying speeds; to provide a variable speed transmission which, when not in motion, allows the belt used thereon to become slack; to thereby lengthen the normal life of the belt, decrease belt stretching, reduce upkeep costs; and to provide the various other advantages and results made evident from the following specification.

I accomplish the object of my invention by the use of an adjustable sheave or sheaves for a driving or driven unit, on which rides a belt upon the external contacting circumference at their intermeshing point, said belt connecting with and riding upon a second driven or driving sheave which may optionally be of the variable type or of the fixed construction.

Referring to the accompanying drawings which form a part of this specification and in which similar letters of reference refer to similar parts throughout the various views.

Figure 1 is a side view of the sheave mounted on a motor A and on the sliding base B with the speed adjustment screw R holding the sheave at its low speed position. The intermeshing side sections C and $C^2$ are shown distanced upon the sleeve E, with the belt D in low speed position.

Figure 2 is a side view of the sheaves mounted side by side on the shaft F for a multi-belt unit, with the intermeshing side sections C and $C^2$ distanced upon the shaft F, with the belt D in low speed position.

Figure 12:
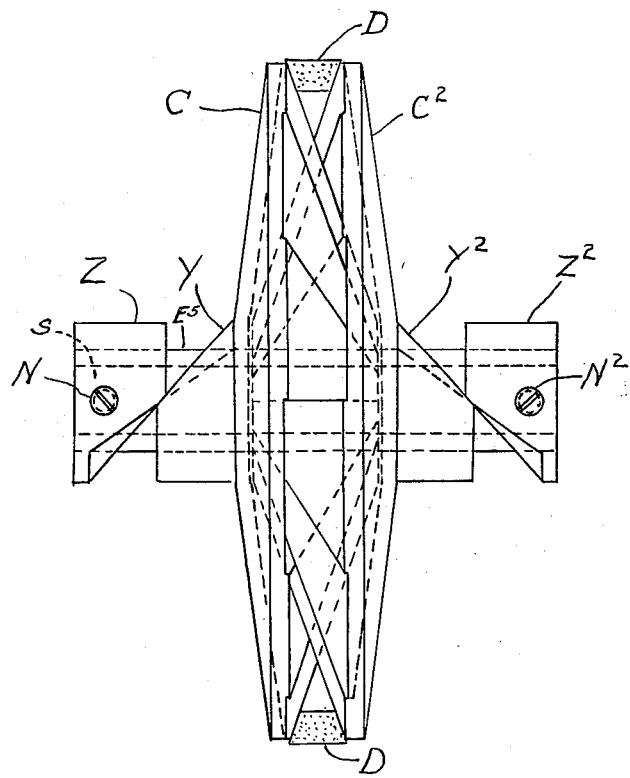

Figure 3 is a side view of the sheave mounted on the motor A and on the sliding base B with the speed adjustment screw R set at high speed position. The intermeshing side sections C and $C^2$ are shown close together on the sleeve E, in which position they are forced by action caused by the keys J and $J^2$ in the spiral keyways G and $G^2$. N and $N^2$ show set screws in opposite ends of the sleeve E to provide for turning the unit end for end on the motor spindle S, so the motor A will always pull the load on the belt D in the right direction on the sheaves and the keys J and $J^2$ registering in the spiral keyway G and $G^2$ which have left and right hand leads and form a V on the sleeve E. U is the sliding plate under the motor A, and is a part of base B.

Figure 4 shows an end view of the sheave mounted on the motor A. The plate U may be adjusted by the adjustment screw R on the bottom frame T of the base B. The two intermeshing side sections C and $C^2$ are shown close together and the belt D shown at high speed position. The sleeve E is fastened to motor spindle S by the set screws N and $N^2$. The two keys J and $J^2$ are located in parts C and $C^2$. The tension spring H extends through the sheave and is fastened by pins I and $I^2$ to parts C and $C^2$.

Figure 5 shows a sectional view of the sheave on lines A—A in Figure 6 with the two intermeshing side sections C and $C^2$ distanced with the belt D at low speed position. The sleeve E is shown mounted on the motor spindle S, the two intermeshing side sections C and $C^2$ being shown mounted on and keyed to the sleeve E by the keys J and $J^2$ in the left and right hand spiral keyways G and G² in the sleeve E. N and N² show the two set screws by means of which the sleeve can be fastened to the motor spindle S from either end of the sheave. H shows the tension spring which acts as a governor and holds the intermeshing side sections together when the unit is running idle. The spring H extends through the parts C and C² and is fastened by pins I and I².

Figure 6 is an end view of Figure 5 or the sheave.

Figure 7 shows a detail of keys J and J² which keys are assembled from the inside of the intermeshing side sections C and C².

Figure 8 is a part sectional view of the sheave on lines A—A in Figure 6, with the belt D shown at high speed position and the intermeshing side sections C and C² intermeshed closely together to hold belt D in its highest speed position.

Figure 9 shows a sectional view of an alternate means of accomplishing the same results as shown in Figure 5, by threading the sleeve E³ with a left and right thread X and X² and threading the keys in parts C and C² to fit the thread X and X².

Figure 10 shows a sectional view of a construction accomplishing the same results as shown in Figure 5 plus a reversing means, this being accomplished by two sets of spiral keyways G, G², G³ and G⁴ cut left and right and opposite hand, so that the keys J and J² in parts C and C² can register and travel from one set to the other set of said keyways so to insure the belt D always pulling into the V formed by the parts C and C² as regulated by the keyways. The compression spring O is held on sleeve E⁴ by part C and washer E. The washer E is held to the side section C² by the screws K which slide in a clearance provided through said side section C.

Figure 11 shows a sectional view of an alternate construction accomplishing the same results as shown in Figure 5, the intermeshing side sections C and C² being mounted on the sleeve E⁴ and held at varying speed positions by action of the mechanical governor balls N³ and N⁴ and N⁵ and N⁶ as they revolve, the parts C and C² having a straight keyway which registers with and fits the key on the sleeve E⁴, the governor balls being pinned to cam Q on the sleeve E⁴.

Figure 12 shows a sectional view of an alternate means of accomplishing the same results as shown in Figure 5, by facing the hubs of the intermeshing side sections C and C² with the left and right hand spiral cam parts Y and Y², and mounting side sections C and C² on the sleeve E⁵, on which sleeve are mounted the other parts of the spiral cams Z and Z² which register and contact with the parts Y and Y² on the side sections. N and N² show set screws which secure the sleeve E⁵ to the motor spindle S.

While I have illustrated and described a preferred construction for carrying my invention into effect, this is capable of variations or modifications without departing from the spirit of the invention. I therefore do not wish to be limited to the exact details of construction set forth, but desire to avail myself of such variations and modifications as come within the scope of the appended claims.

My variable speed sheave is designed for use with any standard sheave or pulley with which it is combined by a constant length V belt and means of changing the center to center distance between the sheaves for the purpose of changing the speed of the driven sheave.

It will be understood by those conversant with the art to which this invention appertains, that when connected as above, the variable sheave, comprising the two intermeshing side sections respectively, keyed in left and right hand spiral keyways positioned in V formation on the sleeve, will, when the belt is in motion, cause the belt to pull the intermeshing side sections around the sleeve, and, by action of the keys in the keyways, cause said side sections to move inwardly toward each other, and the intermeshing circumference is by such inward movement, increased in diameter until all belt slack is taken up, and the belt tension is rendered sufficient to pull the load imposed upon it.

It will be further understood that while I have herein described means upon a sleeve for changing the relative position of the sheave sections, the position of said means may as well be upon the shaft of the driving unit, and I desire to have the appended claims construed in the light that one is an equivalent of the other.

The belt will not slip on my variable speed sheave because the greater the pull on the belt the greater the tendency of the intermeshing side sections to come together by action of the keys in the said spiral keyways, and as said side sections come together, the greater becomes their intermeshed circumference, and said circumference continues to increase, until the belt tension is sufficient to carry the load.

The belt holds the proper alignment as the two intermeshing side sections move equally inwardly or outwardly due to action of the keys in the left and right hand spiral keyways which form an equal sided V.

The governor spring H is provided to hold the intermeshing side sections together when idle, or when in motion but pulling no load.

My variable speed sheave is assembled on the motor spindle with the belt pulling in the direction toward the point of the V formed by spiral keyways.

It will be also understood that where I have herein described my construction as applicable to driving units, it is as well applicable to driven units and will be so regarded in the construction of the claims and elsewhere.

Having thus described my invention, I claim as new and desire to secure by Letters Patent of the United States of America:—

1. In a variable speed pulley with faces that are identical, that is adaptable to be mounted and keyed to a rotatable shaft from either face according to the driving direction of the pulley, the pulley consisting of two segmentally intermeshing cone sections, meshed on their conical sides, a sleeve having a spiral keyway that starts from each end and converges equally towards its center, upon which said cone sections are mounted and keyed, keys in the hub of the cone sections to have flattened faces that fit snugly into the spiral keyways on the sleeve, and are assembled from the end of the sleeve, a spring through the cone sections and fastened to their outer faces, which tends to hold the pulley together as a unit so when in motion the conical faces of the cone sections will be contacting the belt with a light pressure, so that the belt will get traction sufficient only to make the keys in the spiral keyways pick up and carry the load imposed on the pulley by the belt.

2. In a variable speed pulley, with faces that are identical, that is adaptable to be mounted and keyed to a rotatable shaft from either face, the pulley consisting of two segmentally intermeshing cone sections, meshed on their conical sides, a sleeve having two spiral keyways that start from each end near the same point and converge equally toward the center but in different directions, upon which said cone sections are mounted and keyed, the keys in the hub of the cone sections to have flattened faces that fit snugly into the spiral keyways on the sleeve and are assembled from the ends of the sleeve, a spring through the cone sections and fastened to their outer faces, which tends to hold the pulley together as a unit so when it is in motion the conical faces of the cone sections will be contacting the belt with a light pressure, so there will be traction on the belt sufficient only to make the keys in the spiral keyways pick up and carry the load imposed on the pulley by the belt.

3. A variable speed unit comprising a non speed varying type grooved pulley, a V-belt, an adjustable sliding motor base for varying the size of the belt contacting surface of the variable pulley, and a variable pulley as set forth in claim 1.

4. A variable speed unit comprising a non speed varying type grooved pulley, a V-belt, a variable pulley as set forth in claim 1, and a means of varying the distance between the driving and driven pulleys.

NOAH J. OAK.